US005832180A

United States Patent [19]

Nomura

[11] Patent Number: 5,832,180

[45] Date of Patent: Nov. 3, 1998

[54] DETERMINATION OF GAIN FOR PITCH PERIOD IN CODING OF SPEECH SIGNAL

[75] Inventor: Toshiyuki Nomura, Tokyo, Japan

[73] Assignee: NEC Corporation, Tokyo, Japan

[21] Appl. No.: 604,743

[22] Filed: Feb. 23, 1996

[30] Foreign Application Priority Data

Feb. 23, 1995 [JP] Japan .................................... 7-035024

[51] Int. Cl.[6] ................................ G01L 3/02; G01L 9/00

[52] U.S. Cl. ........................ 395/2.32; 395/2.28; 395/2.31; 395/2.34; 395/2.33

[58] Field of Search ............................ 395/2.1, 2.28–2.34

[56] References Cited

U.S. PATENT DOCUMENTS

| | | | |
|---|---|---|---|
| 4,868,867 | 9/1989 | Davidson et al. | 395/2.39 |
| 5,208,862 | 5/1993 | Ozawa | 395/2.25 |
| 5,265,190 | 11/1993 | Yip et al. | 395/2.28 |
| 5,307,441 | 4/1994 | Tzeng | 395/2.31 |
| 5,371,853 | 12/1994 | Kao et al. | 395/2.31 |
| 5,396,576 | 3/1995 | Miki et al. | 395/2.31 |
| 5,414,796 | 5/1995 | Jacob et al. | 395/2.38 |
| 5,457,783 | 10/1995 | Chhatwal | 395/2.28 |
| 5,485,581 | 1/1996 | Miyano et al. | 395/2.32 |
| 5,495,555 | 2/1996 | Swaminathan | 395/2.16 |

FOREIGN PATENT DOCUMENTS

| | | | |
|---|---|---|---|
| 0 500 095 | 8/1992 | European Pat. Off. | G10L 9/14 |
| 0 516 439 | 12/1992 | European Pat. Off. | G10L 7/04 |
| 4-171500 | 6/1992 | Japan | G10L 9/18 |
| 4-363000 | 12/1992 | Japan | G10L 9/18 |
| 5-6199 | 1/1993 | Japan | G10L 9/14 |
| 95/16260 | 6/1995 | WIPO | G10L 7/00 |

OTHER PUBLICATIONS

Ozawa et al., "M–LCELP Speech Coding at 4kb/s with Multi–Mode and Multi–Codebook", Ieice Trans. Comm., vol. E77–b, No. 9, pp. 1114–1121, 1994.

"Signal Analysis and System Identification", Corona Publication pp. 82–87, 1988.

Sugamara et al., "Speech Data Compression by LSP Speech Analysis–Synthesis Technique", Journal of IEICE, J64–A, pp. 599–606, 1981.

Ozawa et al., "M–LCELP speech coding at 4kbps", ICASSP–94, 19–22 Apr. 1994, pp. 1/269–272 vol. 1.

Ikekawa et al, "Effective channel coding combined with low bit–rate speech coding for digital cellular system", VTC 1994, 1994 IEEE 44th Vehicular technology conference, 8–10 Jun. 1994, pp. 1685–1689 vol. 3.

*Primary Examiner*—Tariq R. Hafiz
*Attorney, Agent, or Firm*—Foley & Lardner

[57] ABSTRACT

A speech signal coding apparatus includes a dividing section for dividing a speech signal in units of sub-frames. A spectrum parameter section calculates a spectrum parameter for each sub-frame. An error signal generating section generates a perceptual sensitivity weighted error signal from a reproduction signal and the speech signal for a sub-frame. An adaptive code book is referred to based on the perceptual sensitivity weighted error signal so that an adaptive code vector and a pitch period is selected. Also, an excitation code book is referred to based on the perceptual sensitivity weighted error signal so that an excitation code vector from the excitation code book is selected. In a gain code vector section having a gain code book which stores gain code vectors, a gain code book is referred to based on the perceptual sensitivity weighted error signal, so that a gain code vector is selected. Gains are determined from the selected gain code vector in units of time intervals shorter than the sub-frame, and the reproduction signal is generated by weighting the adaptive code vector and excitation code vector with the determined gains in units of time intervals.

15 Claims, 5 Drawing Sheets

DETERMINATION OF GAIN FOR PITCH PERIOD IN CODING OF SPEECH SIGNAL

BACKGROUND OF THE INVENTION

1. Field of the Invention

The present invention relates to coding of a speech signal, and more particularly, to coding of a speech signal at a low bit rate with high quality.

2. Description of Related Art

As a method of effectively coding a speech signal at a bit rate as low as 4 kb/s is conventionally known the technique described in the paper (a reference 1) by K. Ozawa et al. entitled "M-LCELP Speech Coding at 4 kb/s with Multi-Mode and Multi-Codebook" (IEICE Trans. Commun., Vol. E77-b, No. 9, pp. 1114–1121, 1994). In the system, linear predictive coding (LPC) analysis is executed to a speech signal for every frame of, for example, 40 ms at a transmission side. As a result, a spectrum parameter representing a spectrum envelope characteristic of the speech signal and an excitation signal for driving a linear synthesis filter corresponding to the spectrum envelope characteristic are separated. Then, the spectrum parameter and the excitation signal are quantized. The frame is divided into sub-frames of, for example, 5 ms and coding of the excitation signal is executed for every sub-frame. The excitation signal is composed of a period component representative of each of pitch periods of the speech signal, a remaining component, and gains of these components. The period component is selected as an adaptive code book vector which has been stored in a code book called an adaptive code book in which past excitation signals are stored. The remaining component is selected as an excitation code vector stored in an excitation code book which stores predetermined excitation signals. The excitation signal is produced by weighting the adaptive code vector and excitation code vector with the gains read out from gain code books and by adding the weighted results. A reproduction speech signal is synthesized by driving the linear synthesis filter by the excitation signal. The selection of the adaptive code vector, excitation code vector and gains is performed such that the power of an error signal is made minimum when the error signal between the reproduction speech signal and the input speech signal is perceptual-sensitivity-weighted. Indexes corresponding to the selected adaptive code vector, excitation code vector and gains and the above-mentioned spectrum parameter are transmitted to a reception side. The description on the operation at the reception side is omitted.

In the above-mentioned conventional method, since the gains as the parameters of the excitation signal are constant within each sub-frame, it is necessary to elongate transmission patterns for adaptive code vector and excitation code victor, i.e., increase the number of transmission bits, in order to represent the change of the excitation signal in time within each sub-frame. However, it is not practicable. For this reason, it is difficult to reproduce the speech signal of high quality transmitted with a low transmission bit rate.

SUMMARY OF THE INVENTION

The present invention has, as an object, to solve the above-mentioned problems and to provide a method of coding a gain such that the change of excitation signal depending upon time within a sub-frame can be represented, so that a reproduction speech signal of high quality can be obtained in a low bit rate speech signal coding method, and an apparatus for the same.

In order to achieve an aspect of the present invention, a speech signal coding apparatus includes a dividing section for dividing a speech signal in units of first predetermined time intervals, a spectrum parameter section for calculating a spectrum parameter for each first predetermined time interval, an error signal generating section for generating a perceptual sensitivity weighted error signal from an inputted excitation signal and the spectrum parameter for the each first predetermined time interval of speech signal, an adaptive code vector section having an adaptive code book which stores adaptive code vectors, for determining a pitch period and referring to the adaptive code book based on the pitch period to select an adaptive code vector based on the perceptual sensitivity weighted error signal, an excitation code vector section having an excitation code book which stores excitation code vectors, for referring to the excitation code book to select an excitation code vector from the excitation code book based on the perceptual sensitivity weighted error signal, and a gain code vector section having a gain code book which stores gain code vectors, for referring to the gain code book based on the pitch period to select a gain code vector based on the perceptual sensitivity weighted error signal, and for determining gains from the selected gain code vector for every second predetermined time interval shorter than the first predetermined time interval, and for producing the excitation signal from the adaptive code vector, the excitation code vector and the determined gains.

In order to achieve another aspect of the present invention, a method of transmitting a speech signal, comprising the steps:

dividing a speech signal in units of first predetermined time intervals;

calculating a spectrum parameter for each first predetermined time interval to quantizing the spectrum parameter for outputting the quantized spectrum parameter;

generating a perceptual sensitivity weighted error signal from an excitation signal and the spectrum parameter for the each first predetermined time interval of speech signal;

determining a pitch period and referring to an adaptive code book based on the pitch period to select an adaptive code vector based on the perceptual sensitivity weighted error signal, the pitch period being outputted;

referring to an excitation code book to select an excitation code vector from the excitation code book based on the perceptual sensitivity weighted error signal, an index of the selected excitation code vector being outputted;

referring to the gain code book based on the pitch period to select a gain code vector based on the perceptual sensitivity weighted error signal, an index of the selected gain code vector being outputted; and determining gains from the selected gain code vector for every second predetermined time interval shorter than the first predetermined time interval to produce the excitation signal from the adaptive code vector, the excitation code vector and the determined gains.

In order to achieve still another aspect of the present invention, a speech signal coding apparatus, includes a dividing section for dividing a speech signal in units of first predetermined time intervals, an error signal generating section for generating an error signal corresponding to a difference between the speech signal and a reproduction signal for the first predetermined time interval, a vector generating section for generating an adaptive code vector associated with a pitch period in the first predetermined time interval of the speech signal and an excitation code vector associated with a predetermined excitation signal such that the power of the error signal has a minimum value, a weighting section for determining gains for second predetermined time intervals of the first predetermined time interval and weighting the adaptive code vector and the excitation code vector with the determined gains for the second predetermined time intervals to produce the reproduction signal.

The gain code vector section includes the gain code book, a dividing section for dividing each of the adaptive code vector and the excitation code vector into a plurality of segments, each segment having the second predetermined time interval, a gain providing section for referring to the gain code book based on the weighted error signal to read out the selected gain code vector and for determining gains for the segments from the selected gain code vector, and an excitation signal generating section for generating the excitation signal from the segments of the adaptive code vector, the segments of the excitation code vector, and the determined gains for the segments. In the other case, the gain code vector section may include the gain code book, a dividing section for dividing each of the adaptive code vector and the excitation code vector into a plurality of segments, each segment having the second predetermined time interval, a gain providing section for referring to the gain code book based on the weighted error signal to read out the selected gain code vector, a calculating section for interpolating and/or extrapolating, based on gains of the elected gain code vector for at least two segments of each of the adaptive code vector and the excitation code vector, gains for segments of each of the adaptive code vector and the excitation code vector other than the at least two segments, and an excitation signal generating section for generating the excitation signal from the segments of the adaptive code vector, the segments of the excitation code vector, and the gains for the segments. Further, alternatively, the gain code vector section may include the gain code book, a dividing section for dividing each of the adaptive code vector and the excitation code vector into a plurality of segments, each segment having the second predetermined time interval, a storing section for storing a gain of for a second predetermined time interval of each of the adaptive code vector and the excitation code vector in a previous first predetermined time interval, a gain providing section for referring to the gain code book based on the weighted error signal to read out the selected gain code vector, a calculating section for interpolating and/or extrapolating, based on gains of the selected gain code vector for at least one segment of each of the adaptive code vector and the excitation code vector and the gains stored in the storing section, gains for segments of each of the adaptive code vector and the excitation code vector other than the at least one segment, and an excitation signal generating section for generating the excitation signal from the segments of the adaptive code vector, the segments of the excitation code vector, and the calculated gains for the segments.

In this case, the second predetermined time interval may be shorter than the pitch period, or may be equal to the pitch period.

DESCRIPTION OF THE PREFERRED EMBODIMENTS

The speech signal coding apparatus according to the present invention will be described below with reference to the accompanying drawings.

Figure 1:
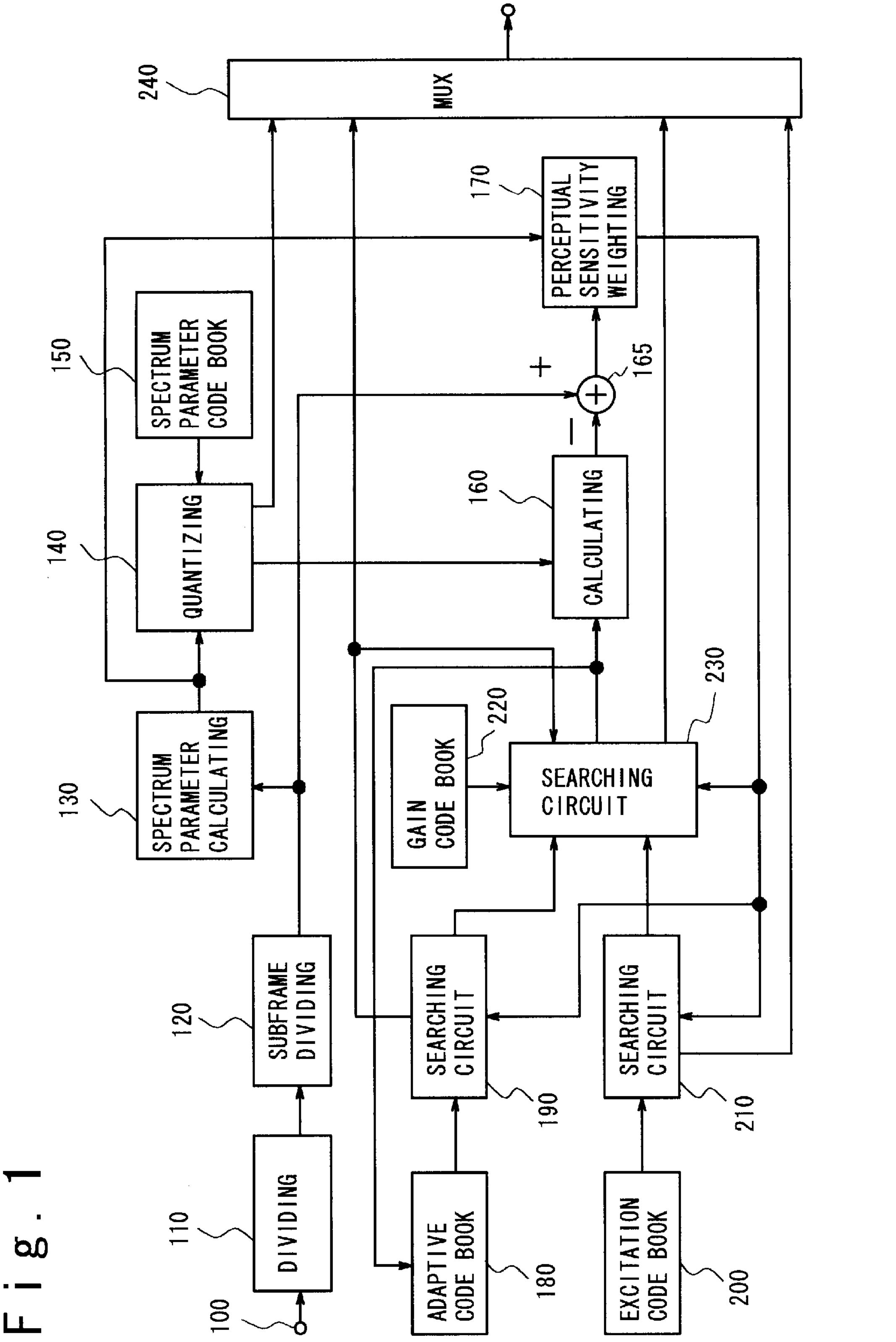
FIG. 1 is a block diagram of a speech signal coding apparatus according to an embodiment of the present invention.

FIG. 1 is a block diagram showing the speech signal coding apparatus according to the first embodiment of the resent invention. Referring to FIG. 1, a speech signal is inputted from an input terminal 100 to a frame dividing circuit 110. The frame dividing circuit 110 divides the speech signal into frames of, for example, 20 ms and supplies the frames to a sub-frame dividing circuit 120. The sub-frame dividing circuit 120 divides each of the frames of speech signal into sub-frames of, for example, 10 ms which are shorter than the frame. The sub-frames are supplied to a spectrum parameter calculating circuit 130 and a subtractor 165. The spectrum parameter calculating circuit 130 sets a window of, for example, 20 ms longer than the sub-frame length to cut out the speech signal, and calculates a spectrum parameter up to the component of a predetermined order (for example, P=tenth order). For determination of the spectrum parameter, the well known LPC analysis and Burg analysis may be used in the spectrum parameter calculating circuit 130. In the embodiment, the Burg analysis is used. The detail of Burg analysis is described in "Signal Analysis and System Identification" (reference 2) by Nakamizo (Corona Pub. pp. 82–87, 1988). Therefore, the description is omitted. Further, the spectrum parameter calculating circuit 130 converts the linear prediction coefficients $\alpha(i)=1, \ldots, P$ calculated based on the Burg analysis method into an LSP parameter adaptive for quantization and interpolation. The conversion of the linear prediction coefficients into the LSP parameter is described in "Speech Data Compression by LSP speech Analysis-Synthesis Technique" by Sugamura el. (Journal of IEICE, J64-A, pp.599–606, 1981) (reference 3). The linear prediction coefficients are supplied to a perceptual sensitivity weighting circuit 170 and the LSP parameter is supplied to a spectrum parameter quantizing circuit 140.

The spectrum parameter quantizing circuit 140 effectively quantizes the LSP parameter. Any of well known methods may be used for vector quantization of the LSP parameter. More particularly, the method disclosed in Japanese Laid Open Patent Disclosures (JP-A-Tokukaihei4-171500 (corresponding to Japanese Patent Application No. Tokuganhei2-297600)(reference 4), JP-A-Tokukaihei4-363000 (corresponding to Japanese Patent Application No. Tokuganhei3-261925) (reference 5) and JP-A-Tokukaihei5-6199 (corresponding to Japanese Patent Application No. Tokuganhei3-155049) (reference 6)) may be used. Further, the spectrum parameter quantizing circuit 140 converts the quantized LSP parameter into a linear prediction coefficients $\alpha'(i)=1, \ldots, P$ which are supplied to a reproduction signal calculating circuit 160. In addition, the spectrum parameter quantizing circuit 140 refers to a spectrum parameter code book 150 and supplies an index representative of the code vector of the quantized LSP parameter to a multiplexer 240.

The reproduction signal calculating circuit 160 institutes a linear predictive synthesis filter using the quantized linear predictive coefficients supplied from the spectrum parameter quantizing circuit 140 and drives the liner prediction synthesis filter by an excitation signal to reproduce a reproduction signal for a sub-frame. The reproduction signal is supplied to the subtractor 165. The subtractor 165 subtract the reproduction signal from the sub-frame of speech signal passed through the sub-frame dividing circuit 120 to produce an error signal. The error signal is supplied to the perceptual sensitivity weighting circuit 170.

The perceptual sensitivity weighting circuit 170 inputs linear prediction coefficients before the quantization from the spectrum parameter calculating circuit 130 for every sub-frame to constitute the perceptual sensitivity weighting filter expressed by the following equation (1).

$$H\omega(z)=\frac{1-\sum_{i=1}^{P}\alpha(i)R_2^i z^{-i}}{1-\sum_{i=1}^{P}\alpha(i)R_1^i z^{-i}} \tag{1}$$

where $R_1$ and $R_2$ (for example, are 0.9 and 1.0, respectively) are weight coefficients for controlling a perceptual sensitivity weighting amount. The perceptual sensitivity weighting circuit 170 drives the perceptual sensitivity weighting filter based on the error signal to produce a perceptual sensitivity weighted error signal. The perceptual sensitivity weighting circuit 170 supplies the weighting error signal to an adaptive code book searching circuit 190, an excitation code book searching circuit 210, and a gain code book searching circuit 230.

The adaptive code book 180 stores past or previous excitation signals associated with pitch periods. The adaptive code book searching circuit 190 determines from a delay (pitch period) d. The searching circuit 190 refers to the adaptive code book 180 to repeatedly read out a segment of the previous excitation signals for the delay (pitch period) d and to link the segments until the length of link is equal to the sub-frame length. As a result, an adaptive code vector $A_d(n)$ corresponding to the delay (pitch period) d is produced. In this case, the adaptive code book searching circuit 190 selects the pitch period and the adaptive code vector such that the power of the weighted error signal which is obtained via the reproduction signal calculating circuit 160 and the perceptual sensitivity weighting circuit 170 has a minimum value within a sub-frame for the produced adaptive code victor, as shown in following equation (2):

$$E_d=\sum_{n=1}^{L}X^2(n)-\frac{\left(\sum_{n=1}^{L}X(n)SA_d(n)\right)^2}{\sum_{n=1}^{L}SA_d^2(n)} \tag{2}$$

where L is a sub-frame length, X(n) is the error signal obtained by perceptual sensitivity weighting the speech signal divided into the sub-frames, and $SA_d(n)$ is a signal obtained by perceptual sensitivity weighting the reproduction signal corresponding to the adaptive code vector $A_d(n)$. The adaptive code book searching circuit 190 supplies the selected pitch period to the multiplexer 240 and the gain code book searching circuit 230 and the selected adaptive code vector to the gain code book searching circuit 230.

An excitation code book 200 stores excitation code vectors associated with a remaining component of the excitation signal other than the pitch period. The excitation code book searching circuit 210 selects the best one from excitation code vectors $C_j(n)$ from the excitation code book 200 such that the sub-frame power of the weighted error signal which is obtained via the reproduction signal calculating circuit 160 and perceptual sensitivity weighting circuit 170 is minimized, as shown in the following equation (3):

$$E_j=\sum_{n=1}^{L}X^2(n)-\frac{\left(\sum_{n=1}^{L}X(n)SA_d(n)\right)^2}{\sum_{n=1}^{L}SA_d^2(n)}-\frac{\left(\sum_{n=1}^{L}X(n)SC_{j'}(n)\right)^2}{\sum_{n=1}^{L}SC_{j'}^2(n)} \tag{3}$$

where $SC_{j'}(n)$ is a signal obtained by orthogonalizing, with respect to $SA_d(n)$, a signal $SC_j(n)$ which is obtained by perceptual sensitivity weighting the reproduction signal corresponding to the excitation code vector $C_j(n)$. The $SC_{j'}(n)$ is given by the following equation (4).

$$SC_{j'}(n)=SC_j(n)-\frac{\sum_{n=1}^{L}SC_j(n)SA_d(n)}{\sum_{n=1}^{L}SA_d^2(n)}\times SA_d(n) \tag{4}$$

In this case, one type of best code vector may be selected. Alternatively, two types of code vector may be selected and one of the two types of code vector may be selected in the gain quantization. In the embodiment, two types of code vector are selected. The excitation code book searching circuit 210 supplies the selected excitation code vector to the gain code book searching circuit 230 and the corresponding index to the multiplexer 240.

The gain code book 220 stores gain code vectors associated with the pitch period. The gain code book searching circuit 230 receives the adaptive code vector $A_d(n)$ and pitch period d from the adaptive code book searching circuit 190 and the excitation code vector from the excitation code book searching circuit 210. The gain code book searching circuit 230 refers to the gain code book 220 based on the pitch period to read out a gain code vector from the gain code book 220. The gain code book searching circuit 230 produces an excitation signal from the adaptive code vector $A_d(n)$, the excitation code vector and the gain code vector in units of time intervals shorter than the sub-frame. The gain code book searching circuit 230 supplies the excitation signal to the reproduction signal calculating circuit 160. The gain code book searching circuit 230 receives the weighted error signal from the perceptual sensitivity weighting circuit 170 and uses it to select the gain code vector. The index of the selected gain code vector is supplied to the multiplexer 240. When the adaptive code vector and excitation code vector is supplied to the reproduction signal calculating circuit 160 for determination of the error signal, the quantization of gains is not executed in the gain code book searching circuit 230 and an optimal gain is used to minimize the power within the sub-frame.

Figure 2:
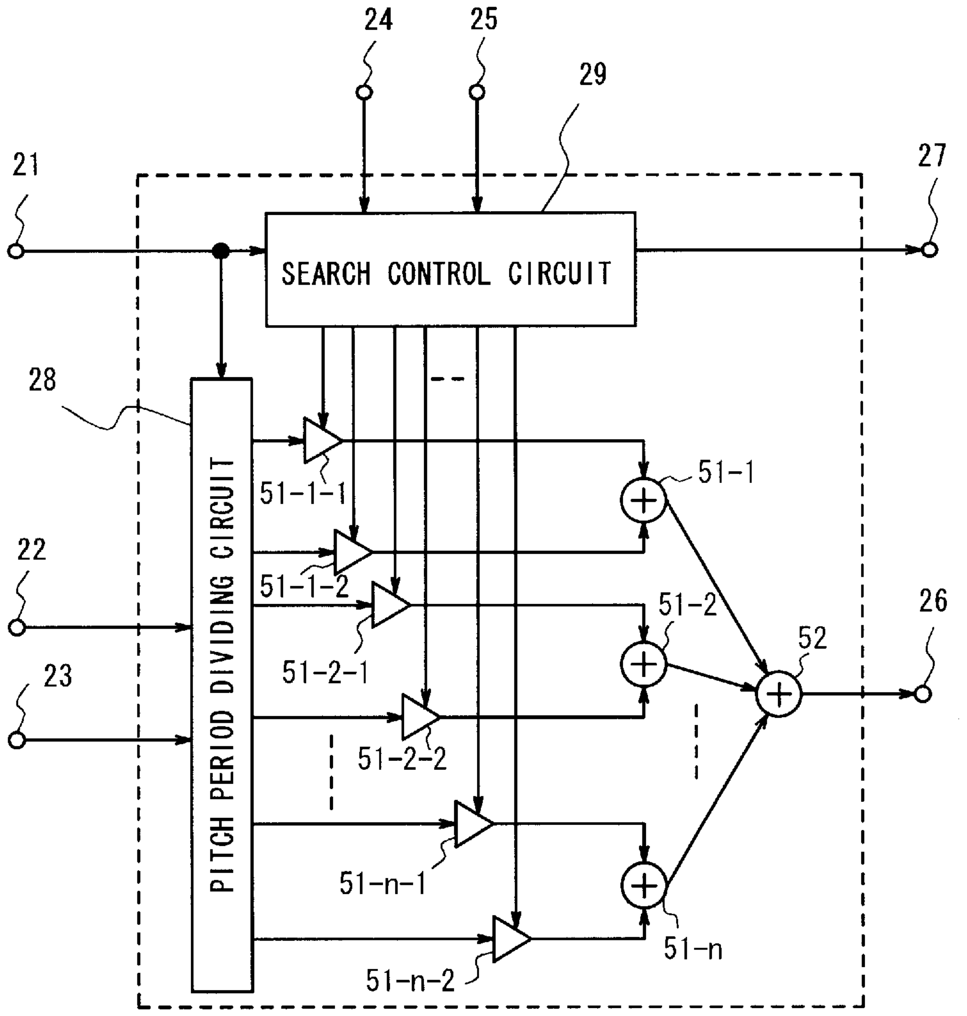
FIG. 2 is a block diagram of a gain code book searching circuit according to the first embodiment of the present invention.

FIG. 2 is a diagram of the structure of the gain code book searching circuit 230 of the speech signal coding apparatus according to the first embodiment of the present invention. Referring to FIG. 2, the pitch period dividing circuit 28 inputs the pitch period d via an input terminal 21, the adaptive code vector $A_d(n)$ via an input terminal 22, and the excitation code vector $C_j(n)$ via an input terminal 23. The dividing circuit 28 divides the adaptive code vector and the excitation code vector in units of predetermined time intervals. A search control circuit 29 controls the whole operation of the gain code book searching circuit 230. The search control circuit inputs the pitch period d via the input terminal 21 and refers to the gain code book 220 to read out a gain code vector from the gain code book 220 via an input terminal 24. The search control circuit 29 inputs the weighted error signal from an input terminal 25 and selects the gain code vector so as to minimize the power of the error signal within a sub-frame, using the following equations (5) and (6).

$$E_k = \sum_{m=1}^{M}\left[\sum_{n=(m-1)d+1}^{n_1(m)} (X(n) - G_{1k}(m)SA_d(n) - G_{2k}(m)SC_j(n))^2\right] \quad (5)$$

$$n_1(m) = \begin{cases} md, & m = 1, \ldots, M-1 \\ L, & m = M \end{cases} \quad (6)$$

where $G_{ik}(m)$ and $G_{2k}(m)$ (m=1, . . . , M) are the k-th gain code vector in 2M-dimensional gain code book 220 and M is the least integer which is greater than a value obtained by dividing the sub-frame length L by the pitch period d. The gian code book searching circuit 230 weights, in a weighting section, the divided portions of the adaptive code vector and the portions of the excitation code vector with the gains calculated from the gain code vector using units 51-i-1 and 51-i-2 (i=1, . . . , n) and adds the weighted result pairs using the adders 51-i. The added results are added by an adder 52 to produce an excitation signal. The gain code book searching circuit 230 outputs the produced excitation signal from an output terminal 26 to the reproduction signal calculating circuit 160. Also, the search control circuit 29 outputs an index representative of the selected gain code vector to the multiplexer 240 via an output terminal 27 and the excitation signal to the adaptive cove book 180 as a previous excitation signal.

Figure 3:
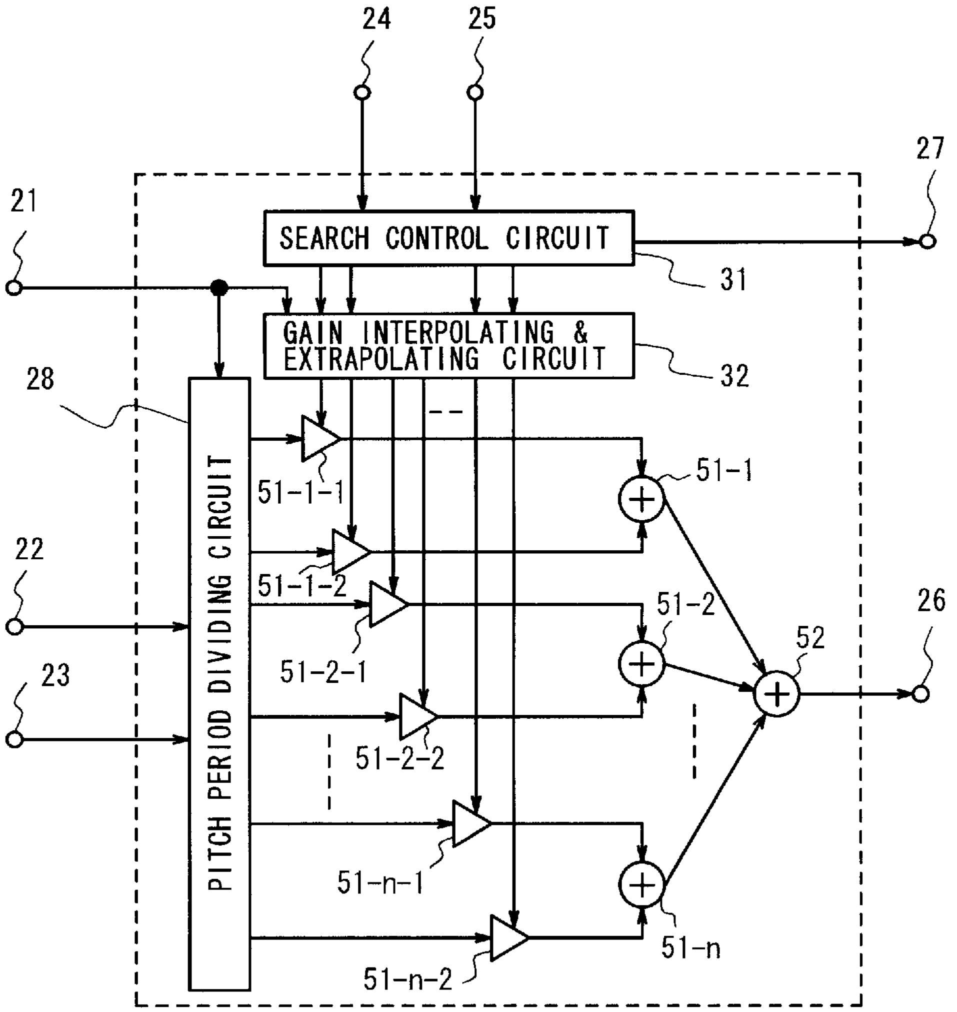
FIG. 3 is a block diagram of the gain code book searching circuit according to the second embodiment of the present invention.

Next, the speech signal coding apparatus according to the second embodiment of the present invention will be described below with reference to FIG. 3. In the speech signal coding apparatus according to the second embodiment, only the gain code book searching circuit 230 is different from the first embodiment. Therefore, the gain code book searching circuit 230 will be described with reference to FIG. 3. In FIG. 3, the pitch period dividing circuit 28 inputs the pitch period d from the input terminal 21, the adaptive code vector $A_d(n)$ from the input terminal 22, and the excitation code vector $C_j(n)$ from the input terminal 23, and divides the adaptive code vector and the excitation code vector in units of pitch periods. The search control circuit 31 controls the whole operation of the gain code book searching circuit 230. In addition, the search control circuit 31 inputs the weighted error signal corresponding to the outputted excitation signal from the input terminal 25 and selects a gain code vector from the gain code book 220 so as to minimize the power of the weighted error signal within a sub-frame. The control circuit 31 inputs the gain code vector from the gain code book 220 from the input terminal 24, and outputs the gain code vector to a gain interpolating and extrapolating circuit 32 as it is. The gain code vectors to be stored in the gain code book 220 may be a four-dimensional vector, so that the capacity of memory can be reduced. The gain interpolating and extrapolating circuit 32 inputs the pitch period d from the input terminal 21, and inputs from the search control circuit 31 gains for time intervals corresponding to at least two pitch periods contained within a sub-frame. In the embodiment, gains $G_{1k}(1)$ and $G_{2k}(1)$ for the time intervals corresponding to the first pitch period and gains $G_{1k}(M)$ and $G_{2k}(M)$ for the time intervals corresponding to the last pitch period are inputted. The gain interpolating and extrapolating circuit 32 interpolates and extrapolates the gains $G_{1k}(2)$, $G_{2k}(2)$, . . . , $G_{1k}(M-1)$, and $G_{2k}(M-1)$ for other time intervals. The gain code book searching circuit 230 produces the excitation signal in the weighting section which is the same as in the first embodiment shown in FIG. 2. The excitation signal (see the equation (5)) is outputted from the output terminal 26 to the reproduction signal calculating circuit 160. Further, the search control circuit 31 outputs the index representative of the selected gain code vector to the output terminal 27 and the excitation signal to the adaptive cove book 180 as a previous excitation signal.

Figure 4:
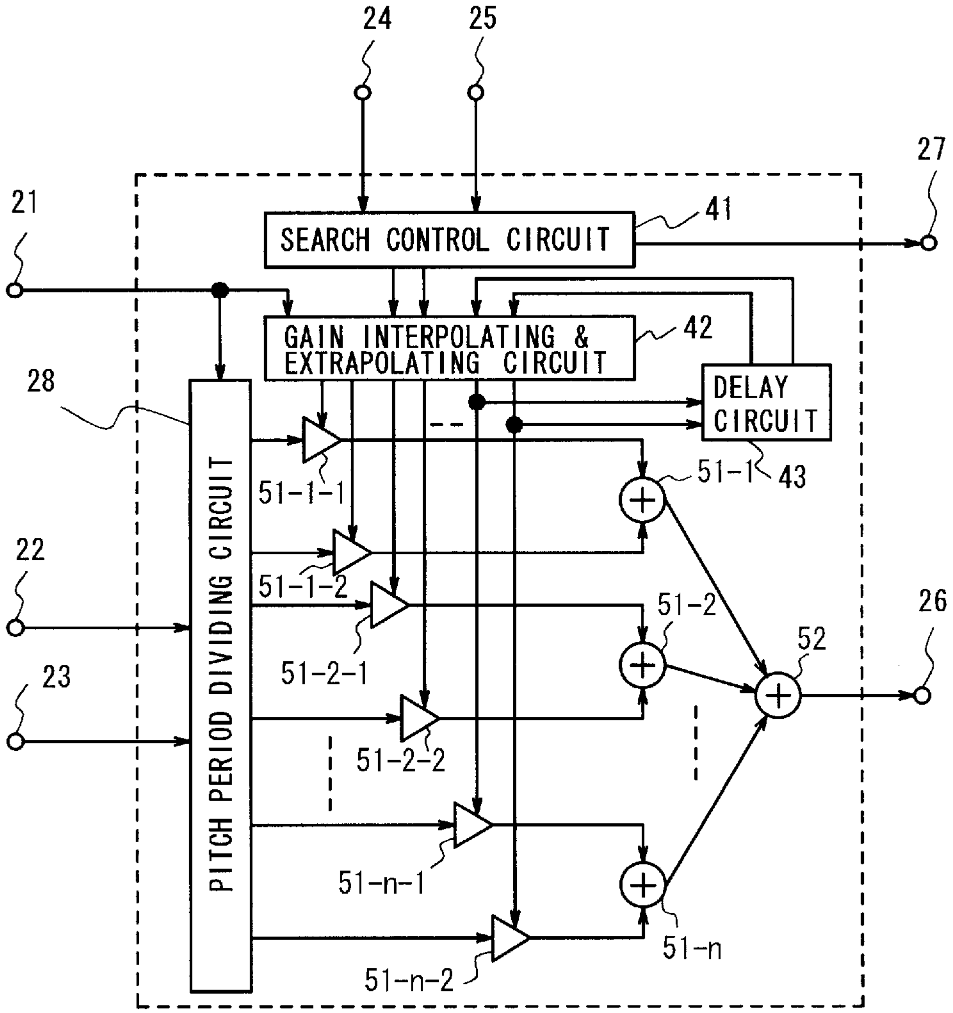
FIG. 4 is a block diagram of the gain code book searching circuit according to the third embodiment of the present invention.

Next, the speech signal coding apparatus according to the third embodiment of the present invention will be described. In the speech signal coding apparatus according to the third embodiment, only the gain code book searching circuit 230 is different from the first embodiment. Therefore, the gain code book searching circuit 230 will be described with reference to FIG. 4. In FIG. 4, the pitch period dividing circuit 28 inputs the pitch period d from the input terminal 21, the adaptive code vector $A_d(n)$ from the input terminal 22, and the excitation code vector $C_j(n)$ from the input terminal 23, and divides the adaptive code vector and the excitation code vector in units of pitch periods. The search control circuit 41 controls the whole operation of the gain code book searching circuit 230. In addition, the search control circuit 41 inputs the weighted error signal corresponding to the excitation signal from the input terminal 25 and selects a gain code vector from the gain code book so as to minimize the power of the weighted error signal within a sub-frame. The search control circuit 41 inputs the gain code vector from the gain code book 220 from the input terminal 24, and outputs the gain code vector to a gain interpolating and extrapolating circuit 42 as it is. The gain code vector to be stored in the gain code book 220 may be a two-dimensional vector, so that the capacity of memory can be reduced. The gain interpolating and extrapolating circuit 42 inputs the pitch period d from the input terminal 21. The gain interpolating and extrapolating circuit 42 further inputs gains for at least one pitch period contained within a current sub-frame from the search control circuit 41 (in the embodiment, gains $G_{1k}(M)$ and $G_{2k}(M)$ for the time intervals corresponding to the last pitch period) and inputs from a delay or storing circuit 43 gains for at least one pitch period contained in a past sub-frame (in the embodiment, gains $G_{1k'}(M)$ and $G_{2k'}(m)$ for the time intervals corresponding to the last pitch period of the past sub-frame). The gain interpolating and extrapolating circuit 32 interpolates and extrapolates the gains $G_{1k}(1)$, $G_{2k}(1)$, . . . , $G_{1k}(M-1)$, and $G_{2k}(M-1)$ for other time intervals corresponding to the pitch periods. The same weighting section as in the first embodiment produces an excitation signal using the divided portions of the adaptive code vector and excitation code vector and the calculated gains for the pitch periods. The produced excitation signal is outputted from the output terminal 26 to the reproduction signal calculating circuit 160 and further to the adaptive code book 180. Further, the search control circuit 41 outputs the index representative of the selected gain code vector to the multiplexer 240 via then output terminal 27.

Figure 5:
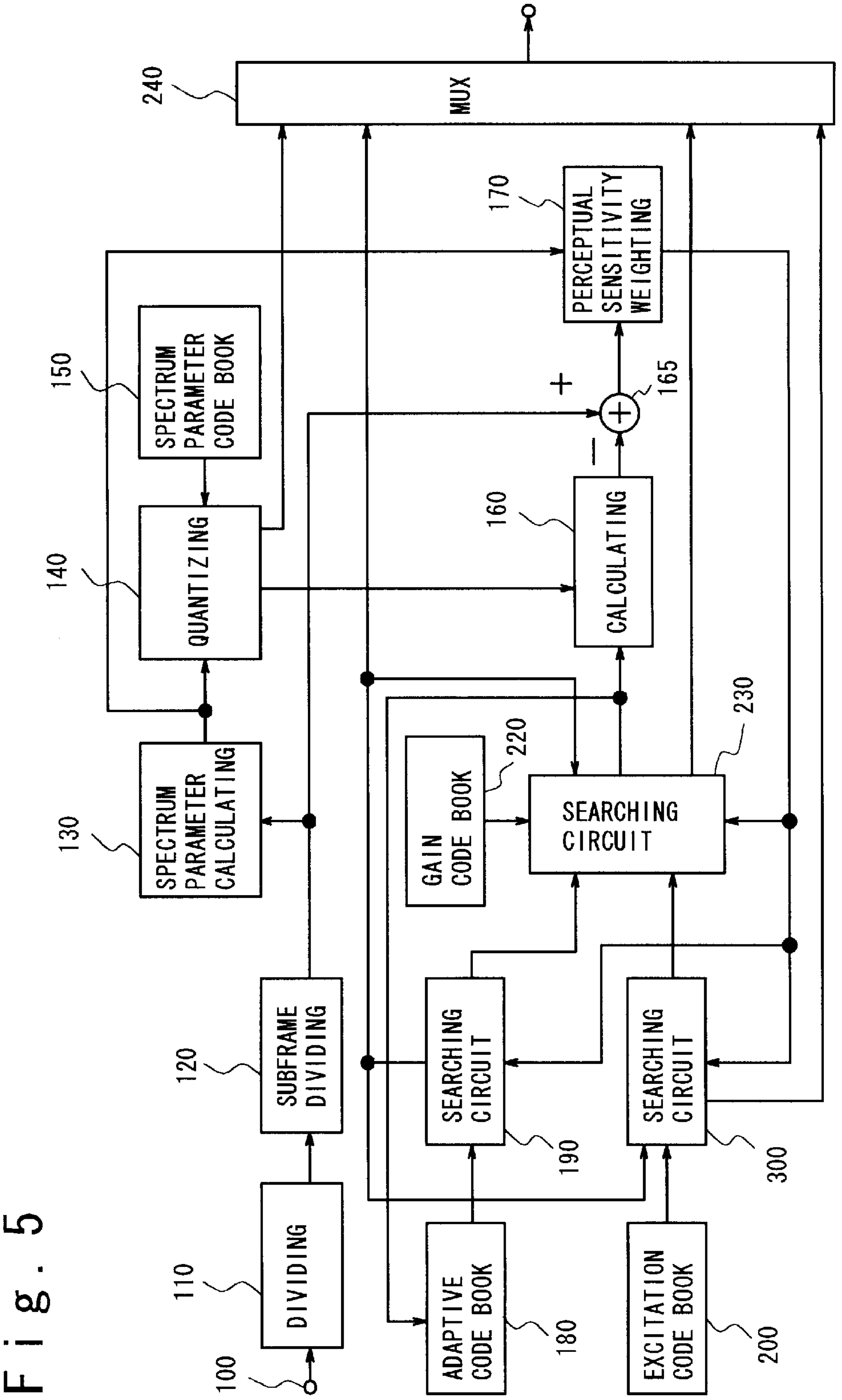
FIG. 5 is a block diagram of the speech signal coding apparatus according to another embodiment of the present invention.

Next, the speech signal coding apparatus according to the fourth embodiment of the present invention will be described. In the speech signal coding apparatus according to the fourth embodiment, only the operation of the excitation code book searching circuit is different from the first embodiment. Therefore, the operation of the excitation code book searching circuit will be described with reference to FIG. 5. Note that the fourth embodiment may be applied to the speech signal coding apparatus according to the second or third embodiment. Referring to FIG. 5, the excitation code book searching circuit 300 calculates, for the excitation code vector $C_j(n)$ stored in the excitation code book 200, the power of the weighted error signal in the sub-frame, (the weighted error signal is obtained via the reproduction signal calculating circuit 160 and the perceptual sensitivity weighting circuit 170), in accordance with the following equations (7) to (9) using the optimal gains for every time interval corresponding to the pitch period inputted from the adaptive code book searching circuit 190 and selects the best excitation code vector so as to minimize the power.

$$E_j = \sum_{m=1}^{M} \left[ \sum_{n=(m-1)d+1}^{n_1(m)} X^2(n) - PA(m) - PC(m) \right] \quad (7)$$

$$PA(m) = \frac{\left( \sum_{n=(m-1)d+1}^{n_1(m)} X(n) SA_d(n) \right)^2}{\sum_{n=(m-1)d+1}^{n_1(m)} SA_d^2(n)} \quad (8)$$

$$PC(m) = \frac{\left( \sum_{n=(m-1)d+1}^{n_1(m)} X(n) SC_j(n) \right)^2}{\sum_{n=(m-1)d+1}^{n_1(m)} SC_j^2(n)} \quad (9)$$

In this case, one type of best code vector may be selected. Alternatively, two types of code vector may be selected and one of the two types of code vector may be selected in the gain quantization. In the embodiment, two types of code vector are selected. Further, the excitation code book searching circuit 300 supplies the selected excitation code vector to the gain code book searching circuit 230 and the corresponding index to the multiplexer 240.

As described above, according to the present invention, the gain representative of the component ratio of the adaptive code vector and the sound code vector can be determined for every pitch period or every predetermined time interval and the change of the excitation signal in time can be effectively expressed. Therefore, the reproduction signal of high quality can be obtained.

What is claimed is:

1. A speech signal coding apparatus comprising:

dividing means for dividing a speech signal in units of first predetermined time intervals;

spectrum parameter means for calculating a spectrum parameter for each first predetermined time interval;

error signal generating means for generating a perceptual sensitivity weighted error signal from an inputted excitation signal and the spectrum parameter for said each first predetermined time interval of speech signal;

adaptive code vector means having an adaptive code book which stores adaptive code vectors, for referring to said adaptive code book to select an adaptive code vector and a pitch period based on the perceptual sensitivity weighted error signal;

excitation code vector means having an excitation code book which stores excitation code vectors, for referring to said excitation code book to select an excitation code vector from said excitation code book based on the perceptual sensitivity weighted error signal; and gain code vector means having a gain code book which stores gain code vectors, for referring to said gain code book to select a gain code vector based on the perceptual sensitivity weighted error signal, and for determining gains from said selected gain code vector for every second predetermined time interval shorter than said first predetermined time interval, and for producing said excitation signal from said adaptive code vector, said excitation code vector and the determined gains.

2. A speech signal coding apparatus according to claim 1, wherein said gain code vector means includes:

said gain code book;

dividing means for dividing each of said adaptive code vector and said excitation code vector into a plurality of segments, each segment having the second predetermined time interval;

gain providing means for referring to said gain code book to read out the selected gain code vector based on said weighted error signal and for determining gains for said segments from said selected gain code vector; and excitation signal generating means for generating said excitation signal from said segments of said adaptive code vector, said segments of said excitation code vector, and said determined gains for said segments.

3. A speech signal coding apparatus according to claim 1, wherein said gain code vector means includes:

said gain code book;

dividing means for dividing each of said adaptive code vector and said excitation code vector into a plurality of segments, each segment having the second predetermined time interval;

gain providing means for referring to said gain code book to read out the selected gain code vector based on said weighted error signal;

calculating means for interpolating and/or extrapolating, based on gains of said selected gain code vector for at least two segments of each of said adaptive code vector and said excitation code vector, gains for segments of each of said adaptive code vector and said excitation code vector other than said at least two segments; and excitation signal generating means for generating said excitation signal from said segments of said adaptive code vector, said segments of said excitation code vector, and said gains for said segments.

4. A speech signal coding apparatus according to claim 1, wherein said gain code vector means includes:

said gain code book;

dividing means for dividing each of said adaptive code vector and said excitation code vector into a plurality of segments, each segment having the second predetermined time interval;

storing means for storing a gain of for a second predetermined time interval of each of said adaptive code vector and said excitation code vector in a previous first predetermined time interval;

gain providing means for referring to said gain code book to read out the selected gain code vector based on said weighted error signal;

calculating means for interpolating and/or extrapolating, based on gains of said selected gain code vector for at least one segment of each of said adaptive code vector and said excitation code vector and said gains stored in said storing means, gains for segments of each of said adaptive code vector and said excitation code vector other than said at least one segment; and excitation signal generating means for generating said excitation signal from said segments of said adaptive code vector, said segments of said excitation code vector, and said calculated gains for said segments.

5. A speech signal coding apparatus according to claim 1, wherein said second predetermined time interval is shorter than said pitch period.

6. A speech signal coding apparatus according to claim 1, wherein said second predetermined time interval is equal to said pitch period.

7. A method of transmitting a speech signal, comprising the steps:

dividing a speech signal in units of first predetermined time intervals;

calculating a spectrum parameter for each first predetermined time interval to quantizing the spectrum parameter for outputting the quantized spectrum parameter;

generating a perceptual sensitivity weighted error signal from an excitation signal and the spectrum parameter for said each first predetermined time interval of speech signal;

referring to an adaptive code book to select an adaptive code vector and a pitch period based on the perceptual sensitivity weighted error signal, the pitch period being outputted;

referring to an excitation code book to select an excitation code vector from said excitation code book based on the perceptual sensitivity weighted error signal, an index of said selected excitation code vector being outputted;

referring to said gain code book to select a gain code vector based on the perceptual sensitivity weighted error signal, an index of said selected gain code vector being outputted; and determining gains from said selected gain code vector for every second predetermined time interval shorter than said first predetermined time interval to produce said excitation signal from said adaptive code vector, said excitation code vector and the determined gains.

8. A method according to claim 7, wherein said determining step includes:

dividing each of said adaptive code vector and said excitation code vector into a plurality of segments, each segment having the second predetermined time interval;

referring to said gain code book to read out the selected gain code vector based on said weighted error signal and for determining gains for said segments from said selected gain code vector; and generating said excitation signal from said segments of said adaptive code vector, said segments of said excitation code vector, and said determined gains for said segments.

9. A method according to claim 7, wherein said determining step includes:

dividing each of said adaptive code vector and said excitation code vector into a plurality of segments, each segment having the second predetermined time interval;

referring to said gain code to read out the selected gain code vector book based on said weighted error signal;

interpolating and/or extrapolating, based on gains of said selected gain code vector for at least two segments of each of said adaptive code vector and said excitation code vector, gains for segments of each of said adaptive code vector and said excitation code vector other than said at least two segments; and generating said excitation signal from said segments of said adaptive code vector, said segments of said excitation code vector, and said gains for said segments.

10. A method according to claim 7, wherein said determining step includes:

dividing each of said adaptive code vector and said excitation code vector into a plurality of segments, each segment having the second predetermined time interval;

storing a gain for a second predetermined time interval of each of said adaptive code vector and said excitation code vector in a previous first predetermined time interval;

referring to said gain code book to read out the selected gain code vector based on said weighted error signal;

interpolating and/or extrapolating, based on gains of said selected gain code vector for at least one segment of each of said adaptive code vector and said excitation code vector and said stored gains, gains for segments of each of said adaptive code vector and said excitation code vector other than said at least one segment; and generating said excitation signal from said segments of said adaptive code vector, said segments of said excitation code vector, and said calculated gains for said segments.

11. A method according to claim 7, wherein said second predetermined time interval is shorter than said pitch period.

12. A method according to claim 7, wherein said second predetermined time interval is equal to said pitch period.

13. A speech signal coding apparatus, comprising:

a dividing section for dividing a speech signal in units of first predetermined time intervals;

an error signal generating section for generating an error signal corresponding to a difference between the speech signal and a reproduction signal for said first predetermined time interval;

a vector generating section for generating an adaptive code vector associated with a pitch period in said first predetermined time interval of said speech signal and an excitation code vector associated with a predetermined excitation signal such that the power of the error signal has a minimum value;

a weighting section for determining gains for second predetermined time intervals of said first predetermined time interval and weighting said adaptive code vector and said excitation code vector with the determined gains for said second predetermined time intervals to produce said reproduction signal.

14. A speech signal coding apparatus according to claim 13, wherein said weighting section includes a section for calculating, based on gains for at least two second predetermined time intervals within the same first predetermined time interval, gains for other second predetermined time intervals within the same first predetermined time interval.

15. A speech signal coding apparatus according to claim 13, wherein said weighting section includes a section for calculating, based on gains for at least one second predetermined time interval within a current first predetermined time interval frame and gains for at least one second predetermined time interval within a previous first predetermined time interval, gains for other second predetermined time intervals within the current first predetermined time interval.

* * * * *